No. 622,392. Patented Apr. 4, 1899.
C. J. REED.
METHOD OF AND MEANS FOR OPERATING ELECTRIC MOTORS.
(Application filed Aug. 17, 1898.)
(No Model.) 3 Sheets—Sheet 1.
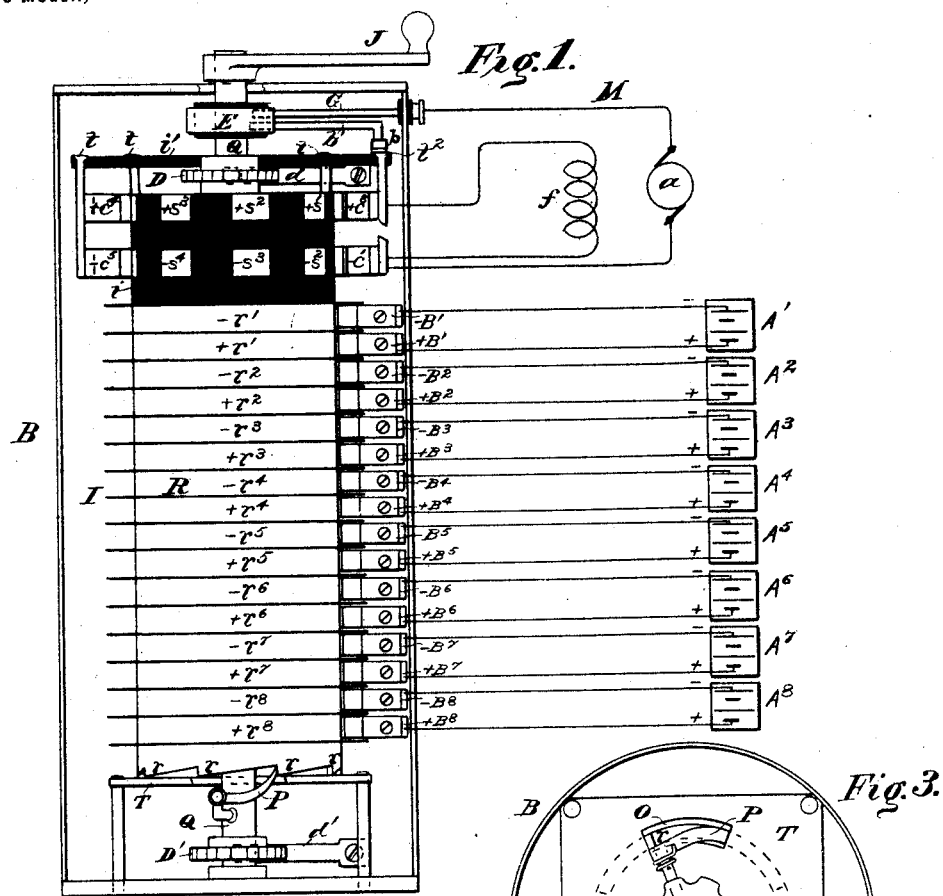
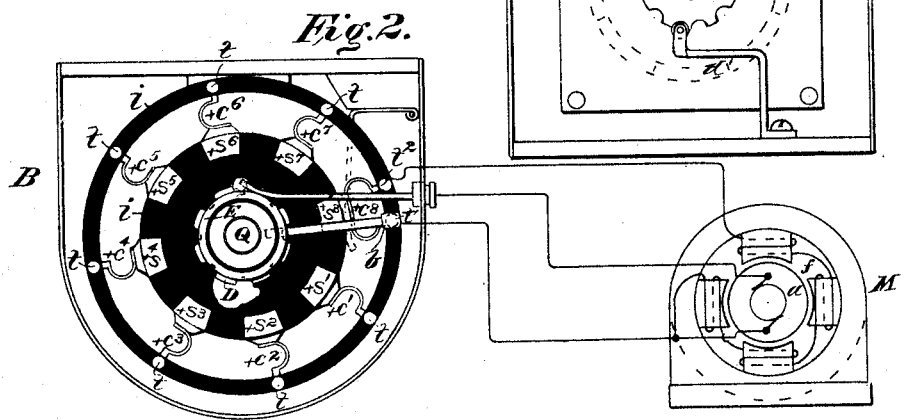
WITNESSES
INVENTOR
Charles J. Reed
BY
Wesley G. Carr
ATTORNEY.

No. 622,392. Patented Apr. 4, 1899.
C. J. REED.
METHOD OF AND MEANS FOR OPERATING ELECTRIC MOTORS.
(Application filed Aug. 17, 1898.)
(No Model.) 3 Sheets—Sheet 2.

WITNESSES:
INVENTOR
Charles J. Reed
BY
Wesley G. Carr
ATTORNEY.

No. 622,392. Patented Apr. 4, 1899.
C. J. REED.
METHOD OF AND MEANS FOR OPERATING ELECTRIC MOTORS.
(Application filed Aug. 17, 1898.)
(No Model.) 3 Sheets—Sheet 3.

UNITED STATES PATENT OFFICE.

CHARLES JOHN REED, OF PHILADELPHIA, PENNSYLVANIA.

METHOD OF AND MEANS FOR OPERATING ELECTRIC MOTORS.

SPECIFICATION forming part of Letters Patent No. 622,392, dated April 4, 1899.

Application filed August 17, 1898. Serial No. 688,771. (No model.)

*To all whom it may concern:*

Be it known that I, CHARLES JOHN REED, a citizen of the United States, residing in Philadelphia, in the county of Philadelphia and State of Pennsylvania, have invented a new and useful Improvement in Methods of and Means for Operating Electric Motors, (Case No. 788,) of which the following is a specification.

My invention relates to the operation of electric motors at variable speeds from a divided source of electrical energy; and it has for its object to provide a method and a means whereby a constant electromotive force may be applied to the field-magnet winding or windings of the motor or motors from a fixed number of the divisions of the source of energy, while the electromotive force applied to the armature winding or windings may be varied by varying the number of the divisions of the source of energy connected thereto in series in such a manner that the energy used may be supplied equally, or approximately so, by the several divisions during a given cycle of operations.

In cases where either primary or secondary batteries are employed as the divided source of energy for operating motors it is obviously desirable that the several divisions shall discharge uniformly, or approximately so. This result may be effected in the manner set forth in my application, Serial No. 687,170, filed July 29, 1898—*i. e.*, by supplying energy to the armature at all times from the entire source and varying the energy by varying the groupings of the divisions of said source. Approximately the same result may also be secured by varying the number of divisions connected together and to the armature winding or windings in series and changing the order in which such variations are made in the manner hereinafter set forth. In order that each division may supply its own share of energy, I have devised the method and means hereinafter described, whereby a rotation in service is effected, as will appear by reference to the accompanying drawings, in which—

Figure 4:
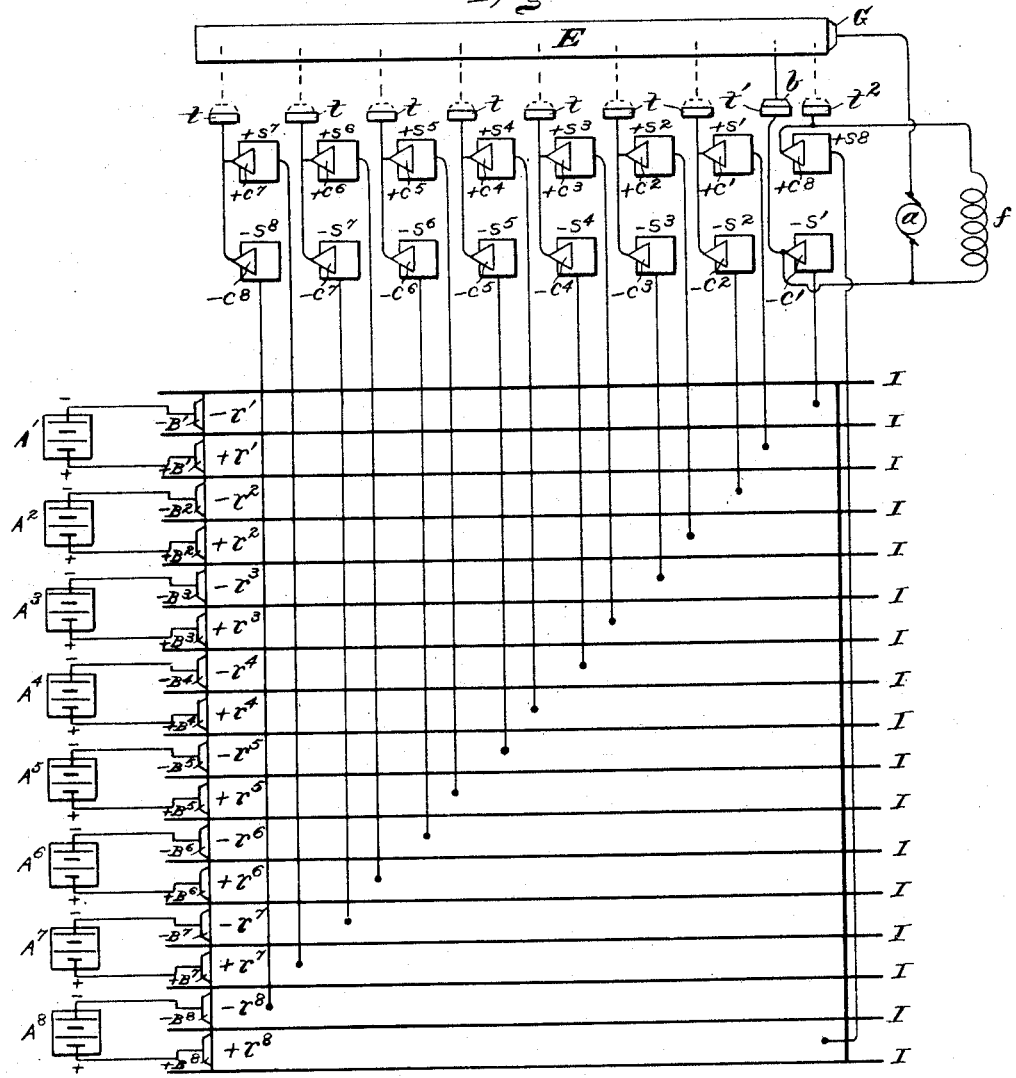
Figure 5:
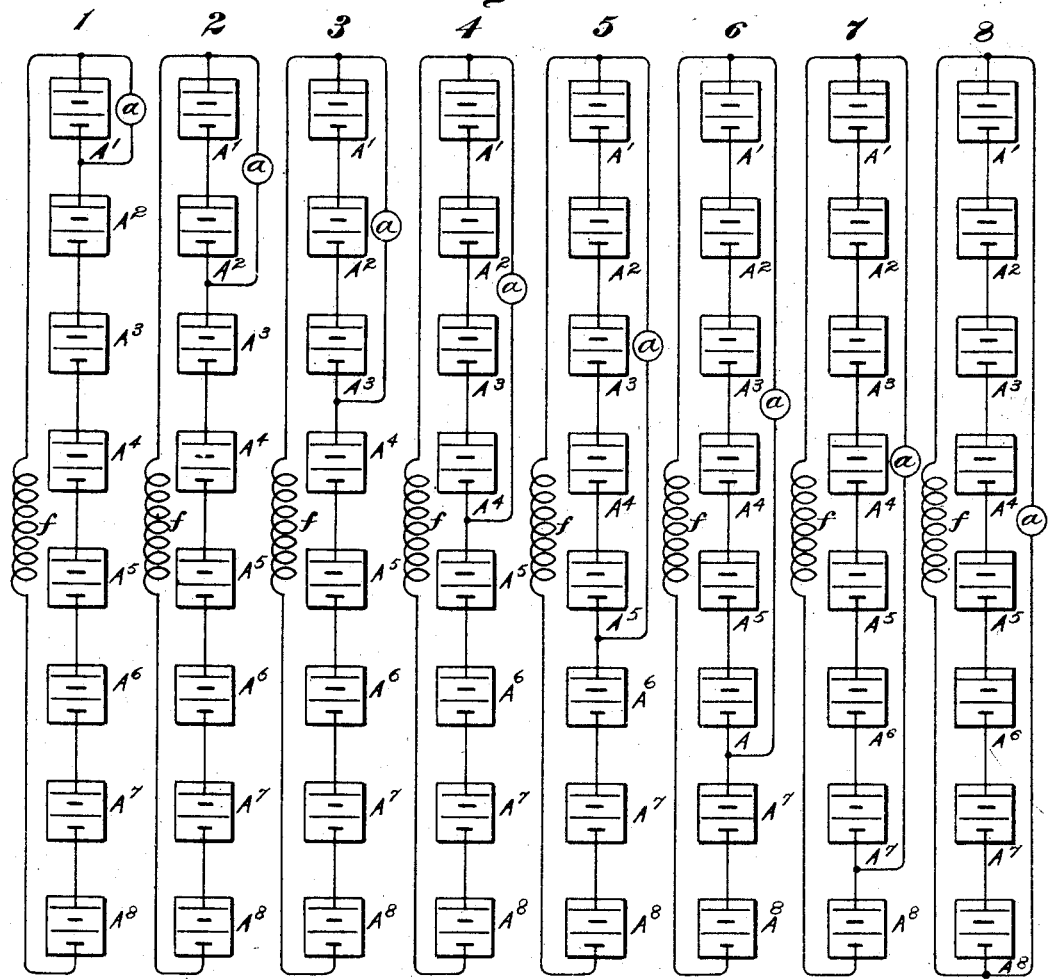

Figure 1 is a partially-diagrammatic view embodying a divided source of electrical energy, a motor, and a controller for varying the electric circuit, the latter being shown in front elevation. Fig. 2 is a plan view of the controller shown in Fig. 1 and a motor shown in end elevation and connected thereto. Fig. 3 is an end view of the controller of Figs. 1 and 2, looking upward. In each of the figures thus far described portions of the inclosing and supporting casing are removed in order to show the operative parts of the mechanism. Fig. 4 is a diagrammatic illustration of the circuits of the system, the controller-drum being shown as developed into a plane. Fig. 5 is a diagram illustrating the successive circuit connections of the motor and source of energy corresponding to a complete rotation of the controller-drum.

Referring now to the details illustrated in the drawings, the source of electrical energy is shown as a secondary battery comprising eight cells $A'$ to $A^8$. These divisions may, however, be primary battery-cells or separate dynamo-electric machines, if desired. They may also be either equal or unequal in capacity and electromotive force, though substantial equality in these respects is for some reasons desirable.

As a means for connecting the source of electrical energy to the motor or motors M, I have shown a controller B, the drum R of which is provided with two sets of contact-rings $-r'$ to $-r^8$ and $+r'$ to $+r^8$, alternately arranged and separated by annular insulating-plates I. Two sets of alternately-arranged contact-fingers $-B'$ to $-B^8$ and $+B'$ to $+B^8$, that constitute the terminals of the battery-cells $A'$ to $A^8$, bear, respectively, upon the rings $-r'$ to $-r^8$ and $+r'$ to $+r^8$.

Above the conducting-rings $-r'$ $+r'$, &c., and separating-plates I the drum is provided with two annularly-arranged sets of contact-segments $+s'$ to $+s^8$ and $-s'$ to $-s^8$, these segments being insulated from each other as well as supported by suitable insulating material $i$. The contact-segments $-s'$ to $-s^8$ are respectively connected by means of conducting-wires buried or concealed in the drum, as is clearly indicated in Fig. 4, to the corresponding contact-rings $-r'$ to $-r^8$, and the segments $+s'$ to $+s^8$ are similarly connected to the corresponding rings $+r'$ to $+r^8$. Above these contact-segments the drum is provided with a notched disk D, the notches in which correspond in number and position to the vertically-arranged pairs of segments $+s'-s^2$, $+s^2-s^3$, &c. A holding-pawl $d$ coöperates with the disk D, as is usual in apparatus of this class.

The drum comprising the parts thus far described is loosely mounted upon the drum-shaft Q and is normally held stationary by the disk D and pawl $d$ during the rotation of the shaft.

A set of stationary brushes or contact-fingers $+c'$ to $+c^8$, corresponding in number to and in the same horizontal plane with the segments $+s'$ to $+s^8$, is supported by a suitable ring $i'$ of insulating material, and below this set of contact fingers or brushes is a similar set $-c'$ to $-c^8$ in the same horizontal plane as the set of contact-segments $-s'$ to $-s^8$. As is fully shown in Fig. 4 and partially in Fig. 1 of the drawings, brushes $+c'$ and $-c^2$ are in vertical alinement and are mechanically and electrically connected together and supported by the ring $i$. The same is true of brushes $+c^2-c^3$, brushes $+c^3$ and $-c^4$, brushes $+c^4$ and $-c^5$, brushes $+c^5$ and $-c^6$, brushes $+c^6$ and $-c^7$, and brushes $+c^7$ and $-c^8$. Each of these pairs of connected brushes is provided with a contact surface or plate $t$, either flush with or projecting slightly above the insulating supporting-ring $i'$, and each of the brushes $-c'$ and $+c^8$ has a similar contact plate or surface designated, respectively, as $t'$ and $t^2$. These contact-surfaces are annularly arranged, so as to be successively engaged by a brush $b$, supported by an arm $b'$, the latter being rigidly attached to and projecting from a contact-ring E, that is rigidly mounted upon but insulated from the shaft Q. A suitable brush G is mounted on the controller-frame in such position as to make contact with the ring E.

The terminals of the field-magnet winding of the motor M are respectively connected to the brushes $+c^8$ and $-c'$, and the terminals of the armature-winding are respectively connected to the brush G and the brush $-c'$, as shown in Figs. 1, 2, and 4.

The lower end of the drum R is provided with a series of ratchet-teeth $r$, which correspond in number and position to the vertical pairs of contact-segments $+s'-s^2$, $+s^2-s^3$, &c. A pawl P is mounted upon the shaft Q and projects upward through an opening O in a plate T, it being pressed into engagement with the teeth $r$ by a suitable spring, as is usual is such devices. The shaft Q is also provided with a notched disk or plate D', the notches in which correspond in number and position to the contact-surfaces $t$, $t'$, and $t^2$. A roller mounted upon the end of a spring-pawl $d'$ coöperates with the notches in the disk D', as is usual in devices of this character.

The operation is as follows: Assuming the operating-handle J of the controller to be in its zero or off position and the drum and brushes to be as indicated in Figs. 1, 2, and 4, it will be seen that the battery-cells A' to A⁸ are all so connected as to supply the motor field-magnet winding $f$ in series and that the armature $a$ is short-circuited. If now the operating-handle J be moved in a clockwise direction a distance corresponding to the space between two adjacent notches in the disk D', the brush $b$ will be moved into contact with the surface $t$, to which the brushes $+c'-c^2$ are connected. When in this position, the battery-cells will be supplying the field-magnet winding of the motor in series and the battery-cell A' will be supplying current to the armature $a$, this relation being such as to operate the motor at a minimum speed and being indicated at position 1 in Fig. 5. A further movement of the handle J in a clockwise direction to the position corresponding to the next notch in the disk D' will move the brush $b$ onto the contact-surface $t$ corresponding to the brushes $+c^2$ and $-c^3$, in which position the battery-cells will be all connected in series with the field-magnet winding $f$ and cells A' and A² will supply the armature $a$ in series, as indicated at position 2 in Fig. 5. By a continued movement of the handle J in the direction above indicated the several battery-cells will be cut into circuit with the armature one after another, as is indicated by positions 3, 4, 5, 6, 7, and 8, Fig. 5, until when the full-on or maximum-speed position is reached the entire set of cells will be connected in series with the armature, provision thus being made for as many rates of speed as there are cells or divisions in the source of energy supplying the motor. During this movement of the shaft Q the pawl P will obviously drag over the adjacent tooth $r$ on the drum until the end of the opening O is reached, when it will pass out of the opening and drag over the under surface of the plate T. If the handle J be now moved in a counter-clockwise direction, the battery-cells will be successively cut out of circuit with the armature in the reverse order to that in which they were cut in, and the pawl P will move over the surface of the plate T until the opening O is reached, this opening being of such size and so located that the pawl P cannot come into contact with a tooth $r$ until the handle J has nearly reached the off position and the armature-circuit is opened. When the opening O is reached, the pawl P will be pressed inward and engage the adjacent tooth $r$, and thus move the drum a distance of one tooth—that is, a distance equal to that between the centers of adjacent contact-segments. By reason of this movement of the drum one space or step, when the next movement of the controller-shaft handle J in a positive or clockwise direction is made the battery-cell A² will be the first one cut into circuit with the armature, cell A³ the second, and so on, the cell A' being the last. The next reversal of the shaft Q will serve to move the drum another step, thus making the battery-cell A³ the first one cut into circuit and cell A² the last, and so on until after a complete cycle of operations the battery-cells will have rotated in service in such manner that all will have been in use approximately the same length of time. Although by this operation the current taken from the first division or battery-cell is a little greater than that taken from the second and that taken from the second a little greater than that taken from third, and so on, yet where the operation of the motor or motors is such as involves the starting or stopping of the same a great number of times within a comparatively short period, as in the case of street-car propulsion, there will be no material difference in the amount of current taken from the several divisions of the source of energy. It will be observed that the field-circuit is opened only during the time that the drum is moving from one position to another and that this does not occur until after the armature-circuit is opened.

Means for opening the field-circuit when not in use may obviously be provided, if desired.

Means for reversing the direction of current-flow in either the field or armature circuit in order to reverse the direction of rotation of the armature may also be employed, as is usual in controllers of the general class to which my invention pertains.

I desire it to be understood that my invention is not limited to a controller of any specific construction or to the operation of a single motor. It will also be understood that the number and character of the windings for both armature and field-magnet may be anything desired and that the number of divisions of the source of electrical energy supplying the field-magnets, as well as the number employed in operating the motor as a whole, may be varied in any manner desired, provided the windings of the motor are adapted to the electromotive forces employed.

I claim as my invention—

1. The method of operating electric motors from a divided source of electrical energy, which consists in supplying the fields from a fixed number of the divisions of the source of energy at a constant electromotive force and supplying the armature from a variable number of the divisions of the source of energy at a variable electromotive force and in rotating the connections at frequent intervals in a fixed order of sequence, substantially as herein set forth.

2. The method of operating electric motors from a divided source of electrical energy, which consists in supplying the field from a fixed number of the divisions and varying the speed of the armature by varying the number of divisions connected in series with said armature, substantially as herein set forth.

3. The method of operating electric motors from a divided source of electrical energy, which consists in supplying the field from a fixed number of the divisions, varying the speed of the armature by varying the number of divisions connected in series with said armature, and in rotating the connections at frequent intervals in a fixed order of sequence, substantially as herein set forth.

4. The method of operating electric motors from a divided source of electrical energy which consists in supplying the fields from a fixed number of the divisions at a constant electromotive force, supplying the armature from a varying number of the divisions in series and changing the connections in a fixed order of sequence when the armature-circuit is opened, substantially as herein set forth.

5. The combination of a divided source of electrical energy, an electric motor and means for connecting the field of the motor with a fixed number of the divisions and the armature with a variable number of the divisions in series and for changing the connections in a fixed order of sequence when the armature-circuit is opened.

6. The method of operating an electric motor at different speeds from a divided source of electrical energy which consists in supplying the motor field-magnet winding from a fixed number of said divisions, varying the number of divisions connected to the armature in series and changing the sequential order of said divisions each time the number of armature-connected divisions is reduced to zero.

7. The combination with an electric motor, of a divided source of electrical energy and a controller comprising means for connecting and maintaining a certain number of the divisions of the source of energy in circuit with the field-magnet winding or windings, means for varying the number of divisions connected in series with the armature and means for changing the order in which the divisions are cut into and out of circuit.

8. The combination with an electric motor and a divided source of electrical energy, of a controller comprising means for connecting and maintaining the divisions in circuit with the motor field-magnet winding, means for varying the number of divisions in circuit with the motor-armature from zero to a maximum and from maximum to zero, and means for changing the sequential order of the divisions subsequent to opening the circuit connection between the last division and the armature.

In testimony whereof I have hereunto subscribed my name this 12th day of August, 1898.

CHARLES JOHN REED.

Witnesses:
 WM. C. TUTTLE,
 ROBT. B. FLETCHER.